(12) United States Patent
Price et al.

(10) Patent No.: US 10,717,367 B1
(45) Date of Patent: Jul. 21, 2020

(54) THERMAL CONTROL SYSTEMS FOR BATTERY CHARGING

(71) Applicants: William M. Price, San Francisco, CA (US); Peteris K. Augenbergs, Woodside, CA (US); Wulfer de Bruijn, San Carlos, CA (US)

(72) Inventors: William M. Price, San Francisco, CA (US); Peteris K. Augenbergs, Woodside, CA (US); Wulfer de Bruijn, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 474 days.

(21) Appl. No.: 15/446,431

(22) Filed: Mar. 1, 2017

Related U.S. Application Data

(60) Provisional application No. 62/306,994, filed on Mar. 11, 2016.

(51) Int. Cl.
*B60L 53/14* (2019.01)
*B60L 53/30* (2019.01)

(52) U.S. Cl.
CPC ............... *B60L 53/14* (2019.02); *B60L 53/30* (2019.02); *B60L 2230/12* (2013.01)

(58) Field of Classification Search
CPC ...... B60L 53/14; B60L 53/30; B60L 2230/12; B60L 53/16; B60L 53/18; B60L 53/302
USPC ......................................................... 165/201
See application file for complete search history.

(56) References Cited

U.S. PATENT DOCUMENTS

| | | | |
|---|---|---|---|
| 5,499,185 A | 3/1996 | Tanzer et al. | |
| 5,545,966 A | 8/1996 | Ramos et al. | |
| 5,909,099 A * | 6/1999 | Watanabe | A61K 31/726 320/108 |
| 6,220,955 B1 * | 4/2001 | Posa | F21V 29/56 454/184 |
| 6,396,241 B1 | 5/2002 | Ramos et al. | |
| 8,098,044 B2 * | 1/2012 | Taguchi | B60L 58/26 320/109 |
| 8,174,235 B2 | 5/2012 | Dyer et al. | |
| 8,350,526 B2 | 1/2013 | Dyer et al. | |
| 9,321,362 B2 * | 4/2016 | Woo | B60L 11/1818 |
| 9,656,560 B2 * | 5/2017 | Lopez | B60L 11/1816 |

(Continued)

FOREIGN PATENT DOCUMENTS

| | | |
|---|---|---|
| CN | 101791970 B | 6/2012 |
| JP | 10223263 A | 8/1998 |

*Primary Examiner* — Tho V Duong
*Assistant Examiner* — Raheena R Malik
(74) *Attorney, Agent, or Firm* — Young Basile Hanlon & MacFarlane, P.C.

(57) ABSTRACT

One thermal control system for use during electric vehicle battery charging includes a charging station thermally conditioning a fluid and sending the fluid to a vehicle charge inlet. The vehicle charge inlet thermally conditions the fluid and sends the fluid to one of a vehicle thermal loop or a vehicle heat exchanger. Another thermal control system includes a charging station thermally conditioning a fluid and sending the fluid to a vehicle charge inlet. The vehicle charge inlet thermally conditions the fluid and sends the fluid back to the charging station. In another thermal control system, a vehicle thermal loop supplies a fluid at a first temperature to a vehicle charge inlet. The vehicle charge inlet thermally conditions the fluid to a second temperature and returns the fluid to the vehicle thermal loop.

19 Claims, 2 Drawing Sheets

(56) References Cited

U.S. PATENT DOCUMENTS

| | | | |
|---|---|---|---|
| 9,701,210 B2* | 7/2017 | Woo | B60L 11/1818 |
| 2013/0029193 A1* | 1/2013 | Dyer | H01M 10/486 |
| | | | 429/62 |
| 2016/0134001 A1* | 5/2016 | Lindholm | H01M 10/66 |
| | | | 299/29 |
| 2016/0221458 A1* | 8/2016 | Lopez | H05K 7/20927 |
| 2016/0381829 A1* | 12/2016 | Niizuma | H02J 50/70 |
| | | | 361/699 |
| 2018/0013180 A1* | 1/2018 | Dyer | H01M 10/486 |

* cited by examiner

THERMAL CONTROL SYSTEMS FOR BATTERY CHARGING

CROSS-REFERENCE TO RELATED APPLICATION(S)

This application claims priority to U.S. Provisional Patent Application Ser. No. 62/306,994, filed Mar. 11, 2016, and entitled "Thermal Control Systems for Battery Charging," the contents of which are incorporated herein by reference.

FIELD

This disclosure relates generally to charging electric vehicle batteries. More particularly, described embodiments relate to thermal control systems used to improve battery charging rates and raise or lower charging temperatures.

BACKGROUND

Electric and hybrid-electric vehicles use a power-storing device in the form of a battery to generate driving force, either alone or in combination with an internal combustion engine. In a fully-electric vehicle, the battery must be externally charged, for example, at a vehicle charging station using a charging cable extending from the charging station to a connector that interfaces with a charge inlet on the vehicle. The charging rate depends on the temperature of the various components within the charging system. The more quickly the battery charges at the charging station, the less wait time is required for the user.

During charging, and particularly during direct-current fast charging, resistive heat is generated by the charging current based on a change in entropy of the battery, and heat is released into the charging cable, the connector, the charge inlet, and the battery, raising the temperature of these current-carrying components. The higher the charging rate or the charging current, the higher the heat generation, limiting the overall rate of charge and increasing the wait time for the user. Existing charging systems rely on vehicle-based components such as a radiator and a fan to cool the battery during charging. The battery or internal combustion engine must expend power to operate these components, creating a noisy charging environment for the user and increasing charging time.

SUMMARY

The disclosure relates to thermal control systems for use during electric vehicle battery charging, for example, using a charging station.

In a first aspect of the disclosure, a thermal control system includes a charging station fluid source supplying a fluid at a first temperature; a charging station connector receiving the fluid at the first temperature and thermally conditioning the fluid to a second temperature; a vehicle charge inlet receiving the fluid at the second temperature and thermally conditioning the fluid to a third temperature; and one of a vehicle thermal loop or a vehicle heat exchanger receiving the fluid at the third temperature, thermally conditioning the fluid to a fourth temperature, and sending the fluid at the fourth temperature to the vehicle charge inlet.

In another aspect of the disclosure, a thermal control system includes a charging station fluid source supplying a fluid at a first temperature to a charging station connector. The charging station connector receives the fluid at the first temperature, thermally conditions the fluid to a second temperature, and sends the fluid at the second temperature to a vehicle charge inlet. The vehicle charge inlet receives the fluid at the second temperature, thermally conditions the fluid to a third temperature, and sends the fluid at the third temperature to the charging station connector.

In another aspect of the disclosure, a thermal control system includes a vehicle thermal loop supplying a fluid at a first temperature to a vehicle charge inlet. The vehicle charge inlet receives the fluid at the first temperature, thermally conditions the fluid to a second temperature, and sends the fluid at the second temperature to the vehicle thermal loop.

BRIEF DESCRIPTION OF THE DRAWINGS

The disclosure is best understood using the following detailed description in conjunction with the accompanying drawings. Similar reference numerals in the drawings designate similar elements. Note that the dimensions of the various features can be expanded or reduced for clarity.

DETAILED DESCRIPTION

Thermal control systems for use with charging stations and electric vehicles are described below. The described thermal control systems can manage temperature changes during battery charging while limiting user inconvenience in order to improve the charging experience. The charging station can include a fluid source, either heated or cooled, to implement thermal control. In the case of a cooled fluid, various components of the charging station and the electric vehicle can be cooled to improve charging speed and passenger comfort. In the case of a heated fluid, flexibility of a charging cable can be improved, battery temperature can be optimized for charging in cold environments, and occupant comfort during charging can be maintained.

In one thermal control system, a circulation path for a first fluid flows between a charging station and a vehicle heat exchanger in an electric vehicle, heating or cooling an interface between a charging station connector and a vehicle charge inlet. The thermal control system also includes a second circulation path for a second fluid that flows between the vehicle heat exchanger and a vehicle thermal loop, heating or cooling vehicle components along the thermal loop such as the vehicle battery, electric motors, gearboxes, cables, bus bars, and power electronics.

The first fluid in the first circulation path is used to change the temperature of the second fluid in the second circulation path, improving the user charging experience by reducing the time required to charge the vehicle battery. The use of a thermally-controlled, external fluid can also reduce noise during charging when various vehicle components such as fans and compressors are not required to control vehicle component temperatures. Additional thermal control systems are further described herein.

Figure 1:
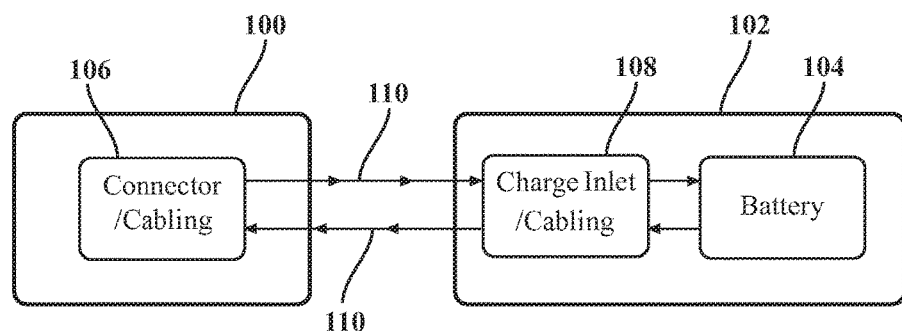
FIG. 1 is a schematic of a charging station and an electric vehicle.

FIG. 1 is a schematic of a charging station 100 and an electric vehicle 102 including a vehicle battery 104 being charged at the charging station 100. The electric vehicle 102 can be a fully-electric vehicle including only the vehicle battery 104 for use in powering a drive system of the electric vehicle 102. In an alternative embodiment, the electric vehicle 102 can be a hybrid electric vehicle including an internal combustion engine working in cooperation with the vehicle battery 104. The electric vehicle 102 can include a controller (not shown) coupled to vehicle battery 104 for determining a charge state for the vehicle battery 104 and for regulating the charging and cooling processes described below.

The charging station 100 can be a commercial charging station, a residential charging interface, or any type of charging system including a charging source (not shown) configured to supply an electrical charge from the charging source to a charging station connector 106, which may include cabling for connection to the electric vehicle 102. The charging source can be a battery, a super capacitor, electric grid with a rectifier, or any other source capable of high power charging of the vehicle battery 104. The charging station connector 106 can be coupled to a vehicle charge inlet 108, which may include cabling for connection to the electric vehicle 102, in order to deliver the electrical charge to the vehicle battery 104. An electrical path 110 is shown by a connection including arrows indicating the movement of the electrical charge between the charging station 100, the vehicle charge inlet 108, and the vehicle battery 104 during charging.

In some embodiments, components of a thermal control system (various embodiments of which are described further below) can be housed within the charging station 100 and configured to supply a thermally-conditioned fluid to the charging station connector 106 for subsequent sending to the vehicle charge inlet 108. Both the charging station connector 106 and the vehicle charge inlet 108 can include fluid conduits that allow the fluid to pass from the charging station connector 106 to the vehicle charge inlet 108. Similarly, the charging station connector 106 and the vehicle charge inlet 108 can include fluid conduits to allow the fluid to pass from the vehicle charge inlet 108 back to the charging station connector 106. The term fluid, or fluid media, encompasses both liquid and gaseous media such as water, glycol-based coolant, pressurized refrigerant, ambient air, and argon gas. The design of the interface between the charging station connector 106 and the vehicle charge inlet 108 can be based on the type of fluid being transferred.

Figure 2:
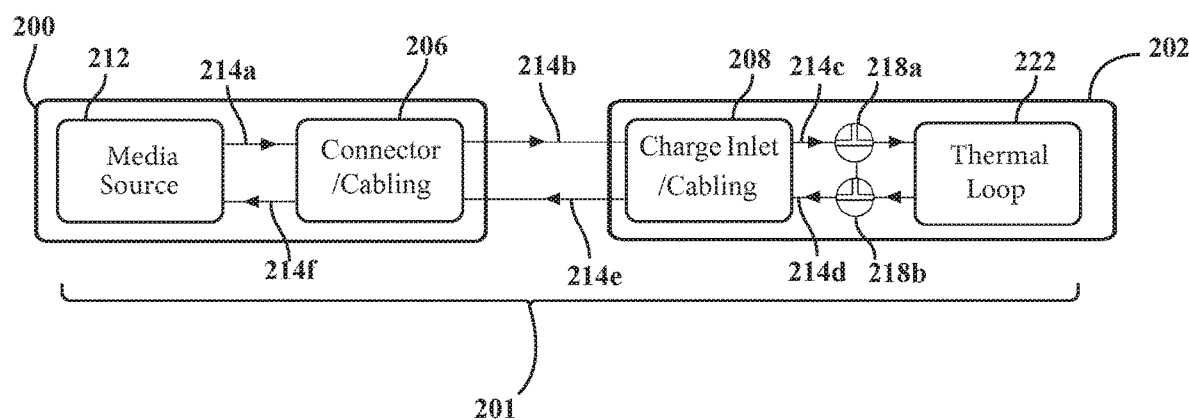
FIG. 2 is a schematic of a first thermal control system for use with an electric vehicle.

FIG. 2 is a schematic of a first thermal control system 201 for use with an electric vehicle 202. The thermal control system 201 can include a charging station fluid source 212 housed within a charging station 200 and configured to supply a fluid, which travels through fluid path portions 214a-214f. As an example, the fluid path portions 214a-214f may each include one or more conduits. The charging station 200 can also supply an electrical charge from a charging source (not shown) to the electric vehicle 202 through a charging station connector 206 in the manner described in FIG. 1.

The fluid is supplied from the charging station fluid source 212 at a first temperature to the charging station connector 206, which may include cabling for connection to the electric vehicle 202. The charging station fluid source 212 is designed for fluid communication with the charging station connector 206, for example, via a first fluid path portion 214a. The charging station fluid source 212 can be a fluid reservoir sized to allow components within the thermal control system 201 to thermally condition the fluid during the charging process. Alternatively, the charging station fluid source 212 can include additional components such as fans, heat exchangers, heaters, or chillers (not shown) to thermally condition the fluid. The terms "thermal conditioning" and "thermally conditioned" are used to indicate heat transfer in either direction between components and the fluid as described both in respect to the thermal control system 201 and additional thermal control systems described in respect to FIGS. 3-5.

In the example of FIG. 2, the fluid can be a glycol-based coolant already in use by the electric vehicle 202. The temperature and flow direction for the fluid at the first temperature is shown by the first fluid path portion 214a between the charging station fluid source 212 and the charging station connector 206.

The charging station fluid source 212 can include any form of heat exchanger capable of heating or cooling the fluid, such as a heat exchanger connected to a refrigeration unit or a radiator (not shown). The charging station fluid source 212 "supplies" the fluid in that it thermally conditions the fluid before it is transferred to the charging station connector 206. "Supply" is used throughout this description to denote both fluid conditioning and fluid transfer between components in fluid communication. The charging station fluid source 212 can be housed within the charging station 200 as shown, or, for example, located remotely from the charging station 200 in the case where several charging stations 200 receive thermally conditioned fluid from a central fluid supply.

The charging station connector 206 can operate in a similar manner to the charging station connector 106 of FIG. 1. The charging station connector 206, which may include cabling for connection to the electric vehicle 202, can thermally condition the fluid during charging to a second temperature and send the fluid to a vehicle charge inlet 208, which may also include cabling for connection to the electric vehicle 202, through a second fluid path portion 214b. In an example where the charging station fluid source 212 supplies a chilled fluid during battery charging, the second temperature associated with the second fluid path portion 214b can be warmer than the first temperature associated with the first fluid path portion 214a since the charging station connector 206 can exchange heat with the fluid during the charging process.

As the fluid travels through the thermal control system 201, heat may be exchanged between components throughout the thermal control system 201. In some implementations, large heat gains or losses occur at certain components, as will be explained herein. Although reference may be made herein to specific temperatures observed at certain points within the thermal control system 201 (first temperature, second temperature, third temperature, etc.) it should be understood that heat gains and losses occur at locations other than those specifically noted.

The charging station connector 206 can also receive the fluid through a fifth fluid path portion 214e from the vehicle charge inlet 208, with the fluid being returned from the electric vehicle 202 through the fifth fluid path portion 214e. The charging station connector 206 "sends" and "receives" the fluid in the sense that the charging station connector 206 is in fluid communication with the charging station fluid source 212 and the vehicle charge inlet 208. "Sending" and "receiving" are used throughout this description to denote fluid transfer between components in fluid communication. Sending and receiving can be implemented, for example, using components such as pumps (not shown.)

The charging station connector 206 can be designed so that the fluid sent through the second fluid path portion 214b and the fluid received through the fifth fluid path portion 214e flow along separate fluid conduits within the charging station connector 206. Thus, in the example where the charging station fluid source 212 supplies a chilled fluid, the fluid sent through the second fluid path portion 214b experiences some heat exchange based on passing through the charging station connector 206, and the fluid received from the fifth fluid path portion 214e has experienced additional heat exchange having been returned from the electric vehicle 202. The fluid that is received at the charging station connector 206 from the fifth fluid path portion 214e is returned to the charging station fluid source 212 through a sixth fluid path portion 214f.

The thermal control system 201 of FIG. 2 also includes several components housed within the electric vehicle 202. As described above, the vehicle charge inlet 208 receives the fluid from the charging station connector 206 through the second fluid path portion 214b and returns the fluid to the charging station connector 206 through the fifth fluid path portion 214e. The vehicle charge inlet 208 can include both vehicle-based charging cables (not shown) and/or a physical interface to the electric vehicle 202.

During electric charging of the vehicle battery 104 at moderate ambient temperatures, both the charging station connector 206 and the vehicle charge inlet 208 can increase in temperature. To reduce this temperature increase, enable higher charging rates, and improve charging efficiency, the fluid passing through the charging station connector 206, the second fluid path portion 214b, and the vehicle charge inlet 208 can be used to absorb heat and keep the charging station connector 206 and the vehicle charge inlet 208 cool to the touch of an operator while rapid charging of the vehicle battery 104 occurs. The fluid exiting the vehicle charge inlet 208 does so along a third fluid path portion 214c. The temperature of the fluid along the third fluid path portion 214c is a third temperature, often differing from the first and second temperatures associated with the first and second fluid path portions 214a, 214b based on the heat exchange that occurs across both the charging station connector 206 and the vehicle charge inlet 208.

The thermal control system 201 can also include a valve system having one or more valves 218a, 218b that allow or prevent the fluid from traveling between the vehicle charge inlet 208 and a vehicle thermal loop 222. The vehicle thermal loop 222 may include any components that may generate or require heat during charging, such as a battery, a charger, DC/DC converters, motors, gearboxes, a radiator, an HVAC system, terminals, bus bars, and contactors.

For example, an upper valve 218a can be positioned along the third fluid path portion 214c that extends from the vehicle charge inlet 208 to the vehicle thermal loop 222, and a lower valve 218b can be positioned along a fourth fluid path portion 214d that extends from the vehicle thermal loop 222 to the vehicle charge inlet 208. In a first position, as shown, the upper valve 218a is open and can allow fluid at the third temperature to travel between the vehicle charge inlet 208 and the vehicle thermal loop 222 through the third fluid path portion 214c. In the first position, the lower valve 218b (if present) is also open to allow the fluid to return to the vehicle charge inlet 208 from the vehicle thermal loop 222 along the fourth fluid path portion 214d.

The vehicle charge inlet 208 is configured to send the fluid to the vehicle thermal loop 222 through the upper valve 218a and to receive the fluid at the second temperature from the vehicle thermal loop 222 through the lower valve 218b, if it is present. The third temperature associated with the fluid sent from the vehicle charge inlet 208 to the vehicle thermal loop 222 is based on heating or cooling that occurs at the charging station connector 206 and the vehicle charge inlet 208 interface, while the temperature of the fluid returned to the vehicle charge inlet 208 from the vehicle thermal loop 222 along the fourth fluid path portion 214d is a fourth temperature that is based on heating or cooling that occurs within the vehicle thermal loop 222.

Though these temperatures can be the same, in many cases they will differ, with the fluid at the fourth temperature being warmer than the fluid at the third temperature in the case where heat loss occurs across the vehicle thermal loop 222 in addition to the heat loss that occurs across the charging station connector 206 and the vehicle charge inlet 208 during the charging process. When the fluid from the charging station fluid source 212 enters the vehicle thermal loop 222 through the interface of the vehicle charge inlet 208, mixing with fluid already present within the vehicle thermal loop 222 occurs. Thus, the fluid can be of the same type within the charging station 200 and within the electric vehicle 202 in the FIG. 2 example.

The valves 218a, 218b in the valve system can also be moved to a second position in which the valves 218a, 218b are closed and fluid flow is not permitted through the third fluid path portion 214c and the fourth fluid path portion 214d in order to prevent the fluid from entering or exiting the vehicle thermal loop 222. Diagrammatically, the illustrated valve symbols for the valves 218a, 218b would be rotated counterclockwise approximately 90 degrees (not shown) to represent the second position. This second position of the valves 218a, 218b can be useful when no fluid is needed within the vehicle thermal loop 222 or when thermal conditioning using the fluid is to be isolated to the vehicle charge inlet 208. In the case where only the vehicle charge inlet 208 thermally conditions the fluid and the vehicle thermal loop 222 does not receive fluid from the third fluid path portion 214c, the third and fourth temperatures would be equal or near equal since the third fluid path portion 214c would directly connect with the fourth fluid path portion 214d when the valves 218a, 218b are in the second position.

Finally, the valves 218a, 218b can be moved to a third position in order to isolate the vehicle thermal loop 222 from the vehicle charge inlet 208, for example, while driving the electric vehicle 202 or during periods when the electric vehicle 202 is not being charged. Diagrammatically, the illustrated valve symbols for the valves 218a, 218b would be rotated clockwise approximately 90 degrees (not shown) to represent the third position. Both the charging station connector 206 and the vehicle charge inlet 208 can include quick-disconnect valves (not shown) or other mechanisms sufficient to retain residual fluid and protect the fluid from contamination.

When the charging station fluid source 212 supplies fluid to the vehicle thermal loop 222, the use of vehicle components traditionally required during heating or cooling of the vehicle battery 104, such as a fan, a radiator, a compressor, a heater, or an accessory drive unit (not shown), etc. can be avoided. The charging experience can be quiet for the user, and the charging station fluid source 212 can be designed to provide hotter or colder temperatures and a higher flow rate for the fluid than would be possible with the use of the vehicle thermal loop 222 alone.

Though the above examples in FIG. 2 are generally described as having a chilled fluid supplied by the charging station fluid source 212 to the electric vehicle 202 during the charging process, the charging station fluid source 212 can also supply a heated fluid, for example, prior to or during the early stages of charging in order to heat the charging station connector 206 and associated cabling to improve flexibility of the cables and ease use of the charging station 200 for the user before or during connection to the electric vehicle 202. The charging station connector 206 and associated cabling can also be coupled to the vehicle charge inlet 208 automatically, for example, by a robot, in which case, improved flexibility of the charging station connector 206 and associated cabling as achieved using heated fluid may be useful to allow the robot better control in making the connection between the charging station 200 and the electric vehicle 202.

Figure 3:
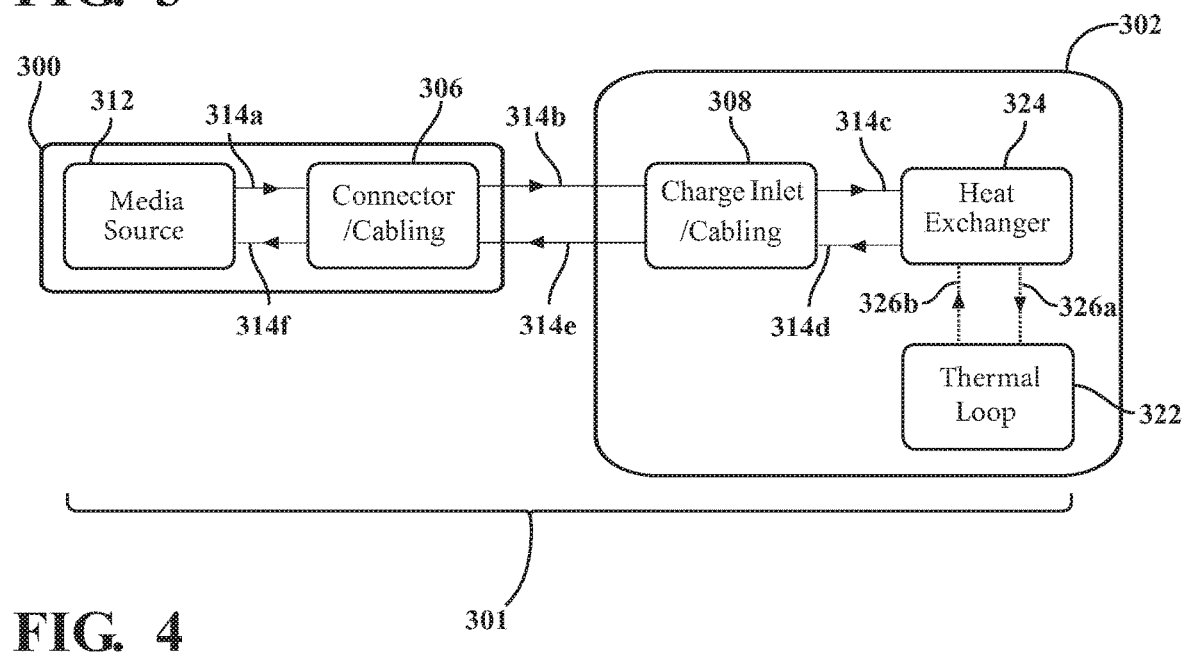
FIG. 3 is a schematic of a second thermal control system for use with an electric vehicle.

FIG. 3 is a schematic of a second thermal control system 301 for use with an electric vehicle 302. The thermal control system 301 can include a charging station fluid source 312 housed within a charging station 300 and supplying a fluid at a first temperature to a first circulation path that includes fluid path portions 314a-314f. The charging station 300 can also supply an electrical charge from a charging source (not shown) though a charging station connector 306 to the electric vehicle 302 in the manner described in FIG. 1.

A first fluid path portion 314a provides the fluid from the charging station fluid source 312 to the charging station connector 306, which may include cabling for connection to the electric vehicle 302. The charging station connector 306 can thermally condition the fluid to a second temperature and send the fluid to a vehicle charge inlet 308, which may include cabling for connection to the electric vehicle 302, through a second fluid path portion 314b. The charging station connector 306 can also receive the fluid from the vehicle charge inlet 308 through a fifth fluid path portion 314e, which returns the fluid from the electric vehicle 302. The fluid that is received at the charging station connector 306 from the electric vehicle 302 is returned to the charging station fluid source 312 through a sixth fluid path portion 314f.

The first circulation path represented by fluid path portions 314a-314f is similar to the circulation path represented by the fluid path portions 214a-214f for the fluid within the charging station 200 and the electric vehicle 202 of FIG. 2. The charging station fluid source 312 also has the ability to supply either heated fluid or chilled fluid to the charging station connector 306 in a manner similar to that described in FIG. 2. However, the vehicle-side component design of the thermal control system 301 in FIG. 3 differs from that of FIG. 2.

In FIG. 3, the vehicle charge inlet 308 receives the fluid from the charging station connector 306 through the second fluid path portion 314b and returns the fluid to the charging station connector 306 through the fifth fluid path portion 314e. The vehicle charge inlet 308 is also in fluid communication with a vehicle heat exchanger 324 by a third fluid path portion 314c through which the fluid thermally conditioned to a third temperature is sent to the vehicle heat exchanger 324 from the vehicle charge inlet 308 and by a fourth fluid path portion 314d through which the fluid thermally conditioned to a fourth temperature returns to the vehicle charge inlet 308 from the vehicle heat exchanger 324. The fluid passing through the vehicle charge inlet 308 from the second fluid path portion 314b is thermally conditioned by the vehicle charge inlet 308 to attain the third temperature. The vehicle charge inlet 308 sends the fluid to the vehicle heat exchanger 324 through the third fluid path portion 314c and receives the fluid at the fourth temperature from the vehicle heat exchanger 324 through the fourth fluid path portion 314d.

The fluid sent from the vehicle charge inlet 308 to the vehicle heat exchanger 324 through the third fluid path portion 314c is thermally conditioned to the third temperature based on heating or cooling that occurs at the charging station connector 306 and the vehicle charge inlet 308 interface. The fluid returned to the vehicle charge inlet 308 from the vehicle heat exchanger 324 through the fourth fluid path portion 314d is thermally conditioned to the fourth temperature based on heating or cooling that occurs within the vehicle heat exchanger 324. In an example where the charging station fluid source 312 supplies a chilled fluid, the fluid at the third temperature along the third fluid path portion 314c is not as warm as the fluid at the fourth temperature along the fourth fluid path portion 314d, though in other examples, the reverse could occur. The first circulation path for the fluid that extends through the charging station 300, the vehicle charge inlet 308, and the vehicle heat exchanger 324 though the fluid path portions 314a-314f is isolated from a second circulation path. The second circulation path is a dedicated circulation path within the electric vehicle 302 associated with the vehicle thermal loop 322 and includes a seventh fluid path portion 326a and an eighth fluid path portion 326b.

The vehicle heat exchanger 324 can be configured to send a second fluid at a fifth temperature to the vehicle thermal loop 322 through the seventh fluid path portion 326a. The fifth temperature of the second fluid sent through the seventh fluid path portion 326a is based on heating or cooling that occurs within the vehicle heat exchanger 324. The heating or cooling that occurs within the vehicle heat exchanger 324 is based only on the proximity of first and second circulation paths, as the vehicle heat exchanger 324 can be designed to keep the fluid within the first circulation path including the fluid path portions 314a-314f separate from the second fluid in the second circulation path including the fluid path portions 326a-326b, for example, using separate conduits within the vehicle heat exchanger 324. Given this separation, the fluid in the first circulation path can be water, glycol-based coolant, pressurized refrigerant, or gaseous media such as ambient air or argon gas while the second fluid in the second circulation path can be a traditional glycol-based coolant since the two different fluid do not mix.

The vehicle thermal loop 322 receives the second fluid at the fifth temperature from the vehicle heat exchanger 324 through the seventh fluid path portion 326a and chills or warms the second fluid during the charging process to a sixth temperature. The second fluid at the sixth temperature is then returned to the vehicle heat exchanger 324 through the eighth fluid path portion 326b. By keeping the second fluid that circulates within the electric vehicle 302 separate from the fluid at the that circulates between the charging station 300 and the electric vehicle 302, contamination of the vehicle-based second fluid is avoided. In an example where both the charging station fluid source 312 and the vehicle thermal loop 322 supply chilled fluid, the second fluid at the sixth temperature along the eighth fluid path portion 326b may be warmer than both the fluid at the third temperature along the third fluid path portion 314c and the fluid at the fourth temperature along the fourth fluid path portion 314d, though in other examples, the reverse could occur. The amount of heating or cooling within the first and second circulation paths depends on the heating or cooling provided to the first and second fluid by the charging station fluid source 312 and the vehicle thermal loop 322.

Figure 4:
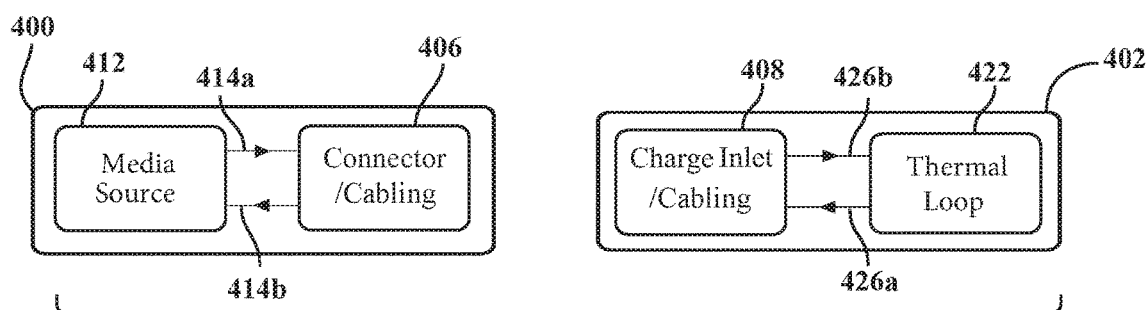
FIG. 4 is a schematic of a third thermal control system for use with an electric vehicle.

FIG. 4 is a schematic of a third thermal control system 401 for use with an electric vehicle 542. The thermal control system 401 can include a charging station fluid source 412 housed within a charging station 400 and supplying a first fluid at a first temperature to a first circulation path that includes fluid path portions 414a-414b. The charging station 400 can also supply an electrical charge from a charging source (not shown) to the electric vehicle 402 through a charging station connector 406 in the manner described in FIG. 1.

The first fluid is supplied from the charging station fluid source 412 at the first temperature to the charging station connector 406, which may include cabling for connection to the electric vehicle 402, through a first fluid path portion 414a. In this example, there is no fluid communication between the charging station connector 406 and a vehicle charge inlet 408, and thermal conditioning of the first fluid is implemented by the charging station connector 406 and any associated cabling. The charging station connector 406 thermally conditions the first fluid to a second temperature and sends the first fluid along a second fluid path portion 414b back to the charging station fluid source 412.

In one example, the first fluid supplied from the charging station fluid source 412 can be heated in order to soften a housing material of the charging station connector 406 and create flexibility in the associated cabling before or during the early stages of charging. Thus, in the example of FIG. 4, the charging station fluid source 412 may send heated first fluid along the first fluid path portion 414a to the charging station connector 406 and through its associated charging cables to ease use of the charging station 400. Though this example describes that the charging station connector 406 is heated by the first fluid, the charging station fluid source 412 can also be configured to supply a chilled first fluid, for example, once charging occurs and a decrease in temperature is desired at the charging station connector 406 and the vehicle charge inlet 408 (through conduction).

The thermal control system 401 is also implemented using vehicle-based components as, for example, cooling of the vehicle charge inlet 408 and its associated cabling can be beneficial during the charging process since heat is produced across the charging station connector 406 and the vehicle charge inlet 408. The electric vehicle 402 includes a vehicle thermal loop 422 that is configured to supply a second fluid at a third temperature to a second circulation path that includes fluid path portions 426a-426b. The second fluid is supplied from the vehicle thermal loop 422 at the third temperature to the vehicle charge inlet 408 and associated cabling through the third fluid path portion 426a. The second fluid can run across or through the vehicle charge inlet 408 and can be heated during charging to a fourth temperature that is warmer than the third temperature. The vehicle charge inlet 408 sends the second fluid at the fourth temperature back to the vehicle thermal loop 422 through the fourth fluid path portion 426b to begin the cooling process and return the second fluid to the third temperature.

In the thermal control system 401 in FIG. 4, the vehicle thermal loop 422 is configured to supply sufficient cooling to reduce charging temperatures of both the various components traditionally within the vehicle thermal loop 422, such as a vehicle battery (not shown) and the vehicle charge inlet 408, and the charging station connector 406 (through conduction) in order to improve charging speed. Though a single second circulation path including the third and fourth fluid path portions 426a, 426b is shown, other circulation paths within the electric vehicle 402 are possible. For example, the electric vehicle 402 can circulate the second fluid between the vehicle charge inlet 408 and a vehicle heat exchanger (not shown) and separately circulate the second fluid (or a third fluid of a different type) between the vehicle heat exchanger and the vehicle battery using, for example, one or more pumps (not shown).

Since the first circulation path including the fluid path portions 414a, 414b is fully isolated from the second circulation path including the fluid path portions 426a, 426b, the first fluid in the first circulation path can be water, glycol-based coolant, pressurized refrigerant, or gaseous media such as ambient air or argon gas while the second fluid in the second circulation path can be a traditional glycol-based coolant since the two different fluid do not mix. Given this separation, either the vehicle-based components or the charging-station-based components of the thermal control system 401 can be operated independently.

Figure 5:
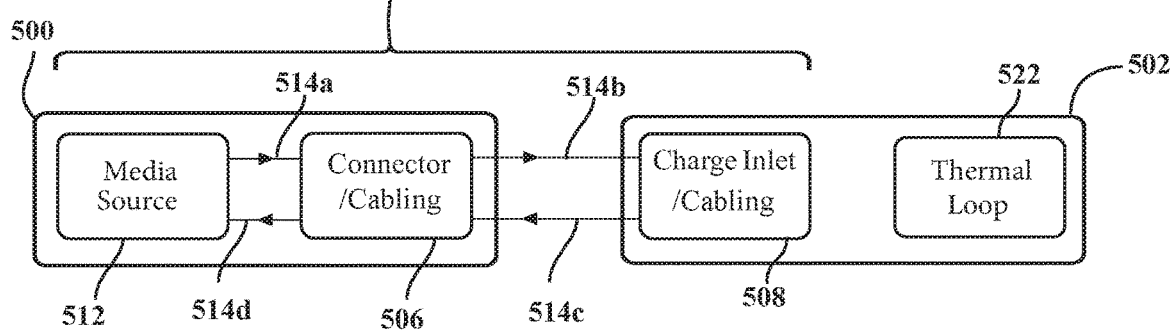
FIG. 5 is a schematic of a fourth thermal control system for use with an electric vehicle.

FIG. 5 is a schematic of a fourth thermal control system 501 for use with an electric vehicle 502. The thermal control system 501 can include a charging station fluid source 512 housed within a charging station 500 and supplying a fluid at a first temperature to a circulation path that includes fluid path portions 514a-514d. The charging station 500 can also supply an electrical charge from a charging source (not shown) to the electric vehicle 502 through a charging station connector 506 in the manner described in FIG. 1.

The fluid at the first temperature is supplied from the charging station fluid source 512 to the charging station connector 506, which may include cabling for connection to the electric vehicle 502, through a first fluid path portion 514a. The charging station connector 506 can thermally condition the fluid to a second temperature and send the fluid at the second temperature along a second fluid path portion 514b to a vehicle charge inlet 508, which may include cabling for connection to the electric vehicle 502. The vehicle charge inlet 508 can thermally condition the fluid to a third temperature and return the fluid at the third temperature to the charging station connector 506 along a third fluid path portion 514c. Finally, the charging station connector 506 can return the fluid back to the charging station fluid source 512 along a fourth fluid path portion 514d.

In one example, the fluid supplied from the charging station fluid source 512 can be heated in order to soften a housing material of the charging station connector 506 and create flexibility in associated cabling before or during the early stages of charging. In another example, the fluid supplied from the charging station fluid source 512 can be chilled in order to decrease temperatures in the charging station connector 506 and the vehicle charge inlet 508 during the charging process.

What is claimed is:

1. A thermal control system, comprising:
a charging station fluid source supplying a charging station fluid at a first temperature;
a charging station connector receiving the charging station fluid at the first temperature and thermally conditioning the charging station fluid to a second temperature;
a vehicle charge inlet receiving the charging station fluid at the second temperature and thermally conditioning the charging station fluid to a third temperature; and
a vehicle thermal loop receiving the charging station fluid at the third temperature, thermally conditioning the charging station fluid to a fourth temperature by mixing the charging station fluid with a vehicle fluid, and sending the mixed fluid at the fourth temperature to the vehicle charge inlet.

2. The system of claim 1, wherein the second temperature is warmer than the first temperature, wherein the third temperature is warmer than the second temperature, and wherein the fourth temperature is warmer than the third temperature.

3. The system of claim 1, wherein the second temperature is cooler than the first temperature and the charging station fluid warms the charging station connector.

4. The system of claim 1, wherein the charging station fluid at the third temperature and the mixed fluid at the fourth temperature travel along separate conduits between the vehicle charge inlet and the vehicle thermal loop.

5. The system of claim 1, wherein the vehicle thermal loop receives the charging station fluid at the third temperature, further comprising:
a valve system comprising one or more valves having first valve positions preventing the charging station fluid from entering and exiting the vehicle thermal loop and second valve positions allowing the charging station fluid to enter and exit the vehicle thermal loop.

6. The system of claim 1, wherein the vehicle thermal loop includes a vehicle heat exchanger and vehicle components that generate or require heat during a charging process of a vehicle.

7. The system of claim 6, wherein the vehicle components include at least one of a battery, a charger, a converter, a motor, a gearbox, and an HVAC system.

8. The system of claim 6, wherein the charging station fluid thermally conditions the vehicle fluid within the vehicle heat exchanger during operation of the thermal control system to form the mixed fluid.

9. A thermal control system, comprising:
a charging station fluid source supplying a charging station fluid at a first temperature;
a charging station connector receiving the charging station fluid at the first temperature and thermally conditioning the charging station fluid to a second temperature;
a vehicle charge inlet receiving the charging station fluid at the second temperature and thermally conditioning the charging station fluid to a third temperature; and
a vehicle heat exchanger receiving the charging station fluid at the third temperature, thermally conditioning the charging station fluid to a fourth temperature using a vehicle fluid supplied from a vehicle thermal loop located wholly within a vehicle, the vehicle thermal loop fluidly coupling a battery and the vehicle heat exchanger, and sending the charging station fluid at the fourth temperature to the charging station connector.

10. The system of claim 9, wherein the second temperature is warmer than the first temperature and the third temperature is warmer than the second temperature.

11. The system of claim 9, wherein the second temperature is cooler than the first temperature and the fluid warms the charging station connector.

12. The system of claim 9, wherein the charging station fluid at the second temperature and the charging station fluid at the third temperature travel along separate conduits between the charging station connector and the vehicle charge inlet.

13. The system of claim 9, wherein the vehicle heat exchanger receives the vehicle fluid at a fifth temperature from the vehicle thermal loop, thermally conditions the vehicle fluid to a sixth temperature using the charging station fluid, and sends the vehicle fluid at the sixth temperature to the vehicle thermal loop.

14. The system of claim 13, wherein the vehicle fluid at the fifth temperature and the vehicle fluid at the sixth temperature travel along separate conduits between the vehicle heat exchanger and the vehicle thermal loop.

15. The system of claim 13, wherein the charging station fluid thermally conditions the vehicle fluid within the vehicle heat exchanger during operation of the thermal control system.

16. The system of claim 15, wherein the vehicle fluid is isolated from the charging station fluid in the vehicle heat exchanger.

17. A thermal control system, comprising:
a vehicle heat exchanger receiving a first fluid from a vehicle charge inlet and a second fluid from a vehicle thermal loop,
wherein the first fluid circulates in a charging station thermal loop that couples a charging station fluid source, a charging station connector, the vehicle charge inlet, and the vehicle heat exchanger,
wherein the vehicle charge inlet thermally conditions the first fluid during a charging process of a vehicle,
wherein the second fluid circulates in the vehicle thermal loop that fluidly couples the vehicle heat exchanger and couples vehicle components that generate or require heat during the charging process of the vehicle,
wherein the first fluid thermally conditions the second fluid within the vehicle heat exchanger during operation of the thermal control system, and
wherein the first fluid and the second fluid mix within the vehicle heat exchanger.

18. The system of claim 17, wherein the vehicle components include at least one of a battery, a charger, a converter, a motor, a gearbox, and an HVAC system.

19. The system of claim 17, further comprising:
a valve system comprising one or more valves having first valve positions preventing the first fluid from entering and exiting the vehicle thermal loop and second valve positions allowing the first fluid to enter and exit the vehicle thermal loop.

* * * * *